United States Patent
Yoshikawa et al.

[11] Patent Number: 5,834,868
[45] Date of Patent: *Nov. 10, 1998

[54] SPINDLE MOTOR

[75] Inventors: Shouichi Yoshikawa; Yasushi Abe, both of Yonago, Japan

[73] Assignee: Matsushita Electric Industrial Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 751,487

[22] Filed: Nov. 18, 1996

[30] Foreign Application Priority Data

Nov. 20, 1995 [JP] Japan .................................. 7-300906

[51] Int. Cl.$^6$ .................................................. H02K 11/00
[52] U.S. Cl. ........................ 310/67 R; 310/92; 360/98.07
[58] Field of Search ..................... 310/67 R, 92; 360/98.07, 99.04, 99.08; 205/163, 164, 87; 277/442; 204/434

[56] References Cited

U.S. PATENT DOCUMENTS

| | | | |
|---|---|---|---|
| 4,672,250 | 6/1987 | Seitz | 310/90 |
| 4,780,948 | 11/1988 | Ferguson et al. | 29/458 |
| 4,804,874 | 2/1989 | Nakamura | 310/92 |
| 5,089,732 | 2/1992 | Konno et al. | 310/67 |
| 5,241,229 | 8/1993 | Katakura et al. | 310/51 |
| 5,304,879 | 4/1994 | Suzuki et al. | 310/67 R |

Primary Examiner—Thomas M. Dougherty
Assistant Examiner—Timothy A. Williams
Attorney, Agent, or Firm—Parkhurst & Wendel

[57] ABSTRACT

Although a rotor shaft of a spindle motor for driving an optical disc is constituted by stainless steel not to cause damage or friction when the disc is mounted or removed, it is intended to provide a spindle motor which does not require to use a material with bad workability such as stainless steel. A rotor shaft or a rotor cap mounted on the rotor shaft is made from a resin material or an alloy material with good workability such as brass, and a hard coating is provided on its surface to provide hardness necessary for components made of a material with good workability.

8 Claims, 7 Drawing Sheets

SPINDLE MOTOR

FIELD OF THE INVENTION

The present invention relates to a spindle motor which is used in the field of office automation equipment or audio visual equipment for driving a disk in an audio visual device using a digital disc as its medium or in a computer storage device.

BACKGROUND OF THE INVENTION

Audio visual devices and computer storage devices have increasingly reduced their size, while increasing their capacity. Among the enabling technologies for such devices spindle motors for rotating and driving a digital disc must be smaller, thinner, and have lower power consumption.

Figure 8:
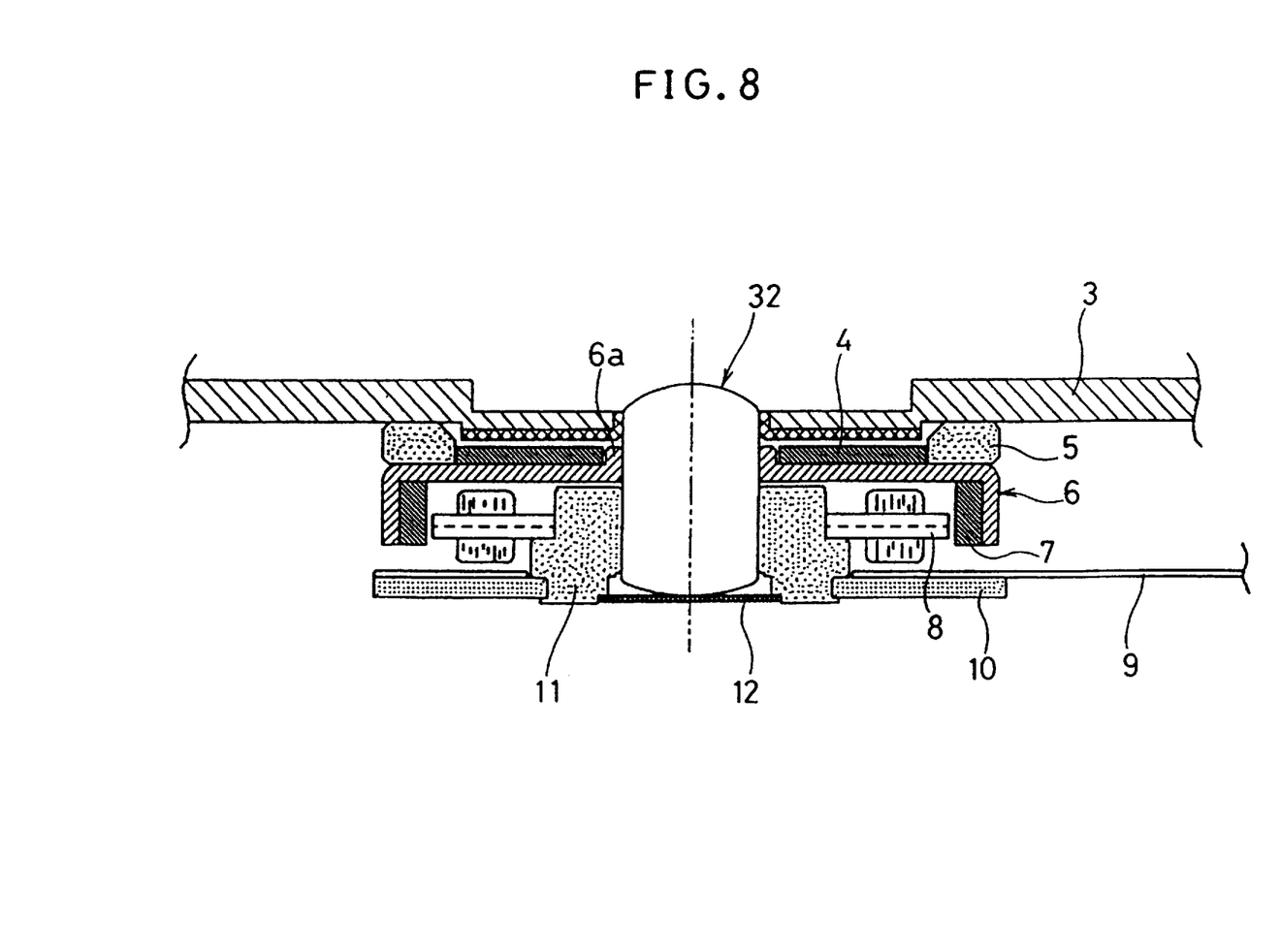
FIG. 8 is a sectional view of the structure of a conventional spindle motor.

FIG. 8 shows a conventional spindle motor.

Reference numeral 3 designates an optical disc media (hereinafter called a "disc") driven by a spindle motor. Reference numeral 32 designates a shaft serving for centering the disc 3. A rotor frame 6 is press fitted on the shaft 32.

Reference numeral 5 designates a spindle hub secured on the rotor frame 6, and receives the disc 3 attracted by a clamp magnet 4. A rotor magnet 7 is mounted on the inner periphery of the rotor frame 6 by bonding or the like.

The shaft 32 is supported by a bearing 11 and a thrust plate 12. The thrust plate 12 is mounted on the bearing 11. A base 10 which is a chassis of the motor and a flexible printed circuit board 9 are also mounted and secured on the bearing 11. A winding core 8 is also secured on the bearing 11 to generate magnetomotive force.

The shaft 32 generally requires hardness of 500 or more in Vickers hardness because it should not be damaged or worn when the disc is mounted or removed, and is conventionally made of stainless steel.

DISCLOSURE OF THE INVENTION

With such conventional arrangement, the outer diameter at the shaft 32 serving for receiving the disc 3 with its inner diameter and centering it is necessarily determined (typically, the diameter being 4 mm). Since the inner diameter of the bearing 11 can be made smaller than the outer diameter of the shaft, there has been limitation in reducing loss by the size of the bearing 11. In addition, there has been also limitation in the outer diameter of the bearing 11, or the inner diameter of the winding core 8, which makes it difficult to assure the space for the winding and constitutes one causes of decreased motor performance.

The clamp magnet 4 is required to have a smaller inner diameter to increase the force attracting the disc 3. However, since a joint 6a is required between the shaft 32 and the rotor frame 6, it is impossible to increase the inner diameter of the clamp magnet 4, which is one cause of limiting increase of the attracting force.

In addition, the stainless steel shaft 32 satisfying the required hardness is expensive not only in the material cost but also in the processing cost for machining such hard material, so that it is difficult to reduce the cost.

The present invention is intended to provide a spindle motor which attains improvement of the performance by reducing the size of the bearing 11, and which can attain reduction of cost for the shaft 32.

The spindle motor of the present invention is characterized in that a hard coating is formed on the surface of the rotor shaft body.

With such an arrangement, the rotor shaft body can be formed by a material such as resin or brass which is inexpensive and has better workability than the conventional material of stainless steel. Hardness required for the rotor shaft can be obtained by providing a hard coating on the surface of rotor shaft body. Specifically, the hard coating is formed by electroless nickel plating. With this approach, hardness of 800 or more in Vickers hardness can be assured only by controlling the thickness of hard coating.

In addition, the spindle motor of the present invention comprises a rotor shaft, a bearing for supporting said rotor shaft, and a rotor cap body secured on said rotor shaft, wherein a hard coating is formed on the surface of said rotor cap body.

With such arrangement, the rotor cap can assure the outer diameter of the rotor shaft determined by the inner diameter of the disc to be driven. Therefore, the rotor shaft can be made thinner than a conventional shaft, so that the bearing can be made smaller. The rotor cap is formed by a resin material or alloy material such as brass which is inexpensive and has better workability than the conventional material of stainless steel, and the required hardness can be obtained by providing a hard coating on the surface of the rotor cap. Specifically, the hard coating is formed by electroless nickel plating. With such approach, hardness of 800 or more in Vickers hardness only by controlling the thickness of coating.

Furthermore, the spindle motor of the present invention comprises a rotor shaft, a bearing for supporting said rotor shaft, a rotor cap body secured on said rotor shaft, and a winding core secured on said bearing, wherein A≧B where the outer diameter of the rotor cap body is A, and the inner diameter of the winding core B, a hard coating being formed on the surface of said rotor cap body.

With such arrangement, it is confirmed by an experiment that loss by the bearing become ⅛ or less. The rotor cap is formed by a resin material or alloy material such as brass which is inexpensive and has better workability than the conventional material of stainless steel, and the required hardness can be obtained by providing a hard coating on the surface of the rotor cap. Specifically, the hard coating is formed by electroless nickel plating. With such approach, hardness of 800 or more in Vickers hardness only by controlling the thickness of coating.

Furthermore, it comprises a rotor shaft, a bearing for supporting said rotor shaft, a rotor cap body secured on said rotor shaft, a rotor frame secured on said rotor cap body, and a clamp magnet mounted on said rotor frame, wherein a recess for securing the rotor frame is formed in the outer surface of the rotor cap body, a hard coating being formed on the surface of said rotor cap body.

With such arrangement, when the recess is formed with a depth larger than the plate thickness of the rotor frame, the inner diameter of the clamp magnet can be closed to the outer diameter of the rotor cap, so that the surface area of the clamp magnet can be larger than that of a conventional one, and the attracting force for the disc is increased. The rotor cap is formed by a resin material or alloy material such as brass which is inexpensive and has better workability than the conventional material of stainless steel, and the required hardness can be obtained by providing a hard coating on the surface of the rotor cap. Specifically, the hard coating is formed by electroless nickel plating. With such approach, hardness of 800 or more in Vickers hardness only by controlling the thickness of coating.

DESCRIPTION OF THE PREFERRED EMBODIMENTS

Now, Embodiments of the present invention are described with reference to FIGS. 1–7.

Embodiment 1

Figure 1:
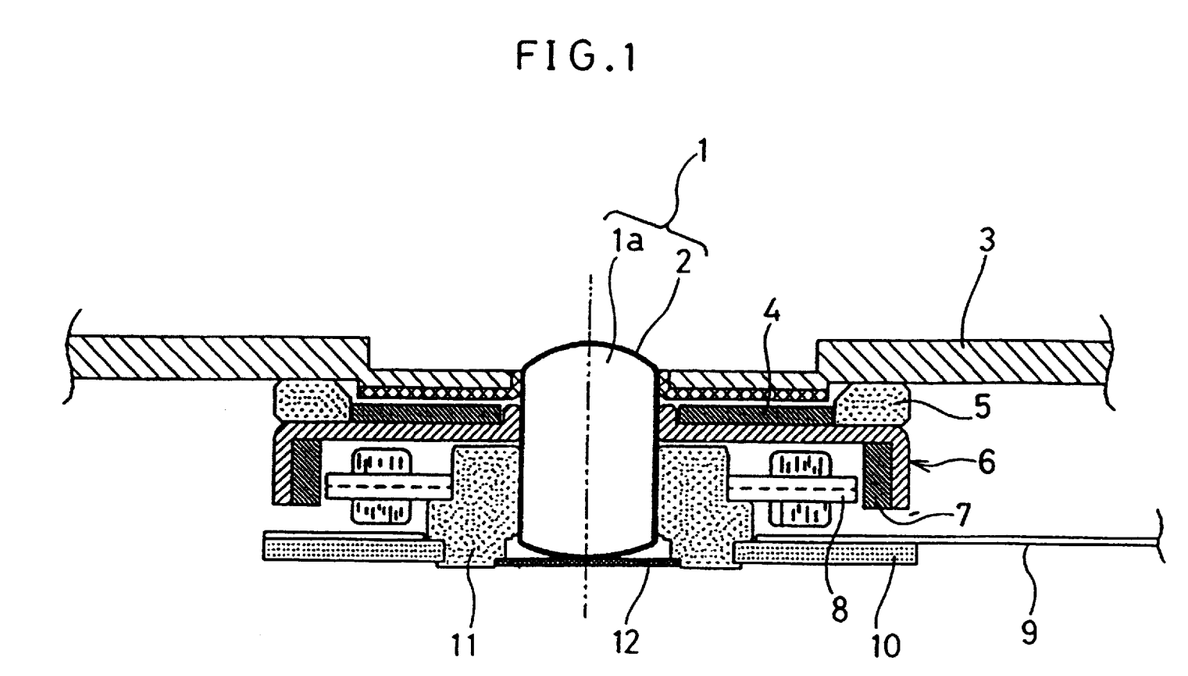
FIG. 1 is a sectional view of the structure of a spindle motor according to Embodiment 1.

FIG. 1 shows a spindle motor of Embodiment 1.

A rotor shaft 1 of Embodiment 1 is constituted by forming a hard coating 2 of 5–10 $\mu$m on the surface of a rotor shaft body 1a with excellent free cutting property with electroless nickel plating.

A rotor frame 6 is secured on the shaft 1 with a method such as press fitting. A spindle hub 5 is secured on the outer periphery of the upper surface of the rotor frame 6, and receives the disc 3 which is attracted onto the upper surface of the rotor frame 6 by a clamp magnet mounted within the spindle hub 5. A rotor magnet 7 is mounted on the inner periphery of the rotor frame 6 by a method such as bonding.

The shaft 1 is supported by the bearing 11 and a thrust plate 12. The thrust plate 12 is mounted on the bearing 11. A base 10 which is a chassis of the motor and a flexible printed circuit board 9 are also mounted and secured on the bearing 11. A winding core 8 is also secured on the bearing 11 to generate electromotive force.

Thus, the rotor shaft 1 with hardness of 800 or more in Vickers hardness is obtained by forming the rotor shaft body 1a from brass which has better workability than stainless steel used for constituting the conventional shaft 32, and forming the hard coating 2 on the surface of the rotor shaft body 1a. Even though the rotor shaft body 1a is formed from brass which has better workability than stainless steel, a spindle motor can be obtained in which the rotor shaft is not damaged or worn when the disc 3 is mounted or removed.

In addition, the thickness of the hard coating 2 can be easily controlled, so that hardness of 800 or more in Vickers hardness can be easily assured only by forming the hard coating 2 with the predetermined thickness on the surface of the rotor shaft body 1a.

While, in this embodiment, the rotor shaft body 1a is constituted by brass, same advantage can be expected by constituting it with other alloy or resin material with good workability, and forming the hard coating 2 on its surface.

Thus, even if hardness of the material itself is not so high, the degree of freedom is increased in the selection of material in view of good workability or low cost of material, so that the cost can be reduced.

Embodiment 2

Figure 2:
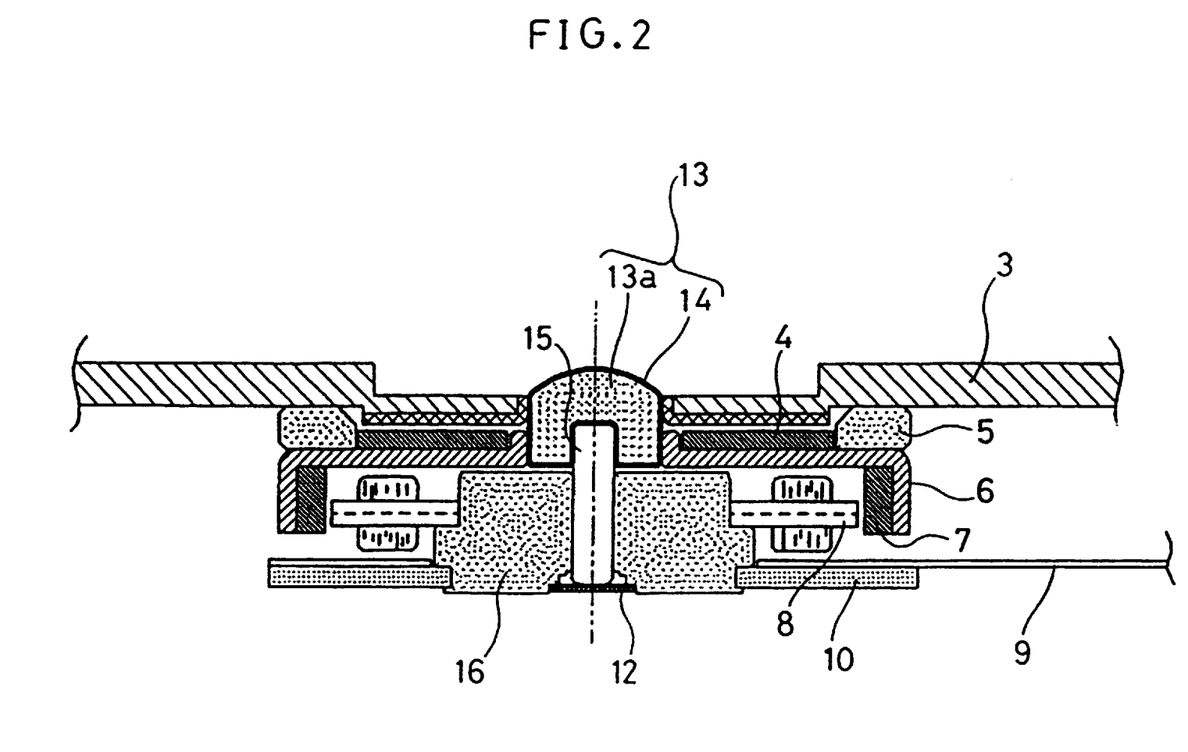
FIG. 2 is a sectional view of the structure of a spindle motor according to Embodiment 2.

FIG. 2 shows a spindle motor of Embodiment 2.

Description is made by identifying components same as those of Embodiment 1 with same references.

A rotor cap 13 is inserted and secured on a rotor shaft 15 by a method such as press fitting. The rotor cap 13 is constituted by forming a hard coating 14 of 5–10 $\mu$m on the surface of a rotor cap body 13a made of brass with electroless nickel plating.

A rotor frame 6 is secured on the rotor cap 13 by, for example, press fitting. A spindle hub 5 is secured on the outer periphery of the upper surface of the rotor frame 6, and receives the disc 3 which is attracted onto the upper surface of the rotor frame 6 by a clamp magnet 4 mounted within the spindle hub 5. A rotor magnet 7 is mounted on the inner periphery of the rotor frame 6 by a method such as bonding.

The rotor shaft 15 is supported by a bearing 16 and a thrust plate 12. The thrust plate 12 is mounted on the bearing 16. A base 10 which is a chassis of the motor and a flexible printed circuit board 9 are also mounted and secured on the bearing 16. A winding core 8 is also secured on the bearing 16 to generate electromotive force.

Thus, the outer diameter at the spindle motor determined by the inner diameter of the disc 3 (typically, 4 mm) can be assured by arranging the diameter of the rotor cap 13 to be 4 mm, so that the outer diameter of the rotor shaft 15 can be made 4 mm or less. It is possible to reduce loss caused between the rotor shaft 15 and the bearing 16. Specifically, the diameter of a disc insertion section is fixed at 4 mm. In FIG. 2, the diameter of the rotor shaft 15 can be freely determined. Between the rotor shaft 15 and the bearing 16, there is such relationship that loss at the bearing 16 increases in proportion to square of the diameter of the rotor shaft 15. This is because the larger the diameter is, the higher peripheral speed of the rotor shaft 15 is, so that friction increases. Therefore, the loss at the bearing 16 can be decreased by reducing the diameter of the rotor shaft 15. This decrease of loss leads to lower power consumption.

In addition, hardness of 800 or more in Vickers hardness can be easily assured only by forming the rotor cap body 13a from brass which has better workability than stainless steel used for constituting the conventional shaft 32, and forming the hard coating 2 on the surface of the rotor cap body 13a. Even though the rotor cap body 13a is formed from brass which has better workability than stainless steel, a spindle motor can be obtained in which the rotor cap 13 is not damaged or worn when the disc 3 is mounted or removed.

Moreover, thickness of the hard coating 2 is easily controlled by electroless nickel plating.

While, in this embodiment, the rotor cap body 13a is constituted by brass, the same advantage can be expected by with other alloys or resin materials with good workability, and forming the hard coating 2 on its surface, so that a spindle motor with low power consumption can be attained.

An alloy material with good workability such as stainless steel or brass or a resin material electroless nickel plated on its surface can be used as the material for the rotor shaft 15.

Embodiment 3

Figure 3:
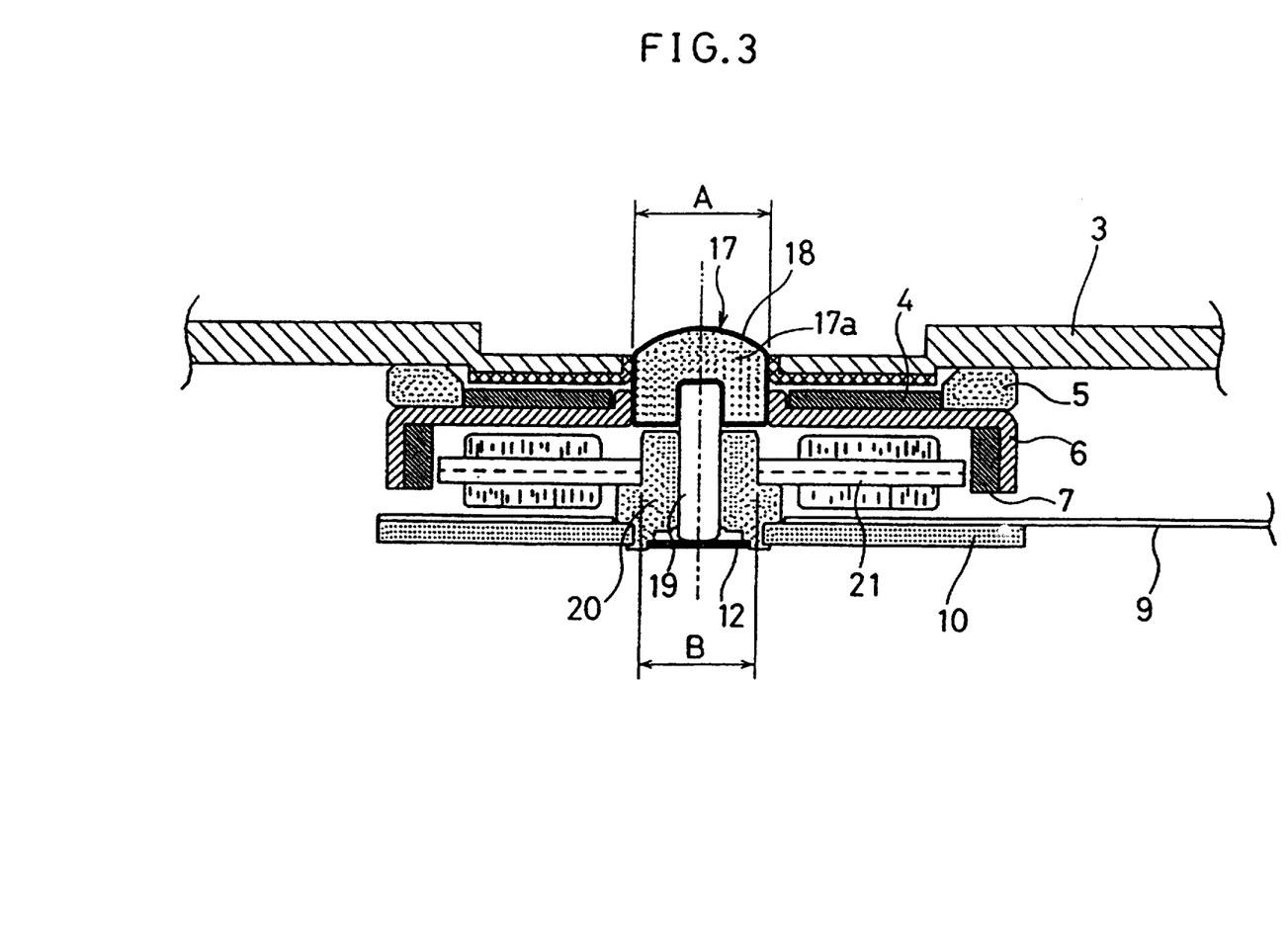
FIG. 3 is a sectional view of the structure of a spindle motor according to Embodiment 3.

FIG. 3 shows a spindle motor of Embodiment 3.

Description is made by identifying components same as those of Embodiment 2 with same references.

A rotor cap 17 is inserted and secured on a rotor shaft 19 by a method such as press fitting. The rotor cap 17 is constituted by forming a hard coating 18 of 5–10 $\mu$m on the surface of a rotor cap body 17a made of brass with electroless nickel plating.

A rotor frame 6 is secured on the rotor cap 17 with a method such as press fitting. A spindle hub 5 is secured on the outer periphery of the upper surface of the rotor frame 6, and receives the disc 3 which is attracted onto the upper surface of the rotor frame 6 by a clamp magnet 4 mounted within the spindle hub 5. A rotor magnet 7 is mounted on the inner periphery of the rotor frame 6 by a method such as bonding.

The rotor shaft 19 is supported by a bearing 20 and a thrust plate 12. The thrust plate 12 is mounted on the bearing 20. A base 10 which is a chassis of the motor and a flexible printed circuit board 9 are also mounted and secured on the bearing 20. A winding core 21 is also secured on the bearing 20 to generate electromotive force.

The outer diameter of the rotor shaft 19 is arranged to be smaller than that of the rotor cap 17, and the diameter surrounded by the winding core 21 of the bearing 20, that is, the inner diameter of the winding core 21 is arranged to be smaller than that of Embodiment 2.

The outer diameter of the rotor cap 17 including the hard coating 18 is generally 4 mm. The thickness between the outer and inner diameters of the bearing 20 is limited to about 1 mm when oil lubrication for the bearing 20 is taken into account. In addition, it has been confirmed by experiments that loss at the bearing becomes ⅛ or less by making the outer diameter of the rotor shaft 19 is made 2 mm or less which is smaller than the conventional diameter of 4 mm.

When the thickness between the outer and inner diameters of the bearing 20 is made 1 mm, and the outer diameter of the rotor shaft 19 is made 2 mm or less, and when the outer diameter of the rotor cap 17 is assumed to be "A," the inner diameter of the winding core 21 to be "B," a motor arrangement for which a relationship of $A \geqq B$ can be established can be attained. Conventionally, it is impossible that this relationship is established.

Here, "A" is assumed to be the outer diameter of the rotor cap 17. The outer diameter should be originally added with the thickness of the hard coating 18 deposited on the surface, but it can be generally ignored.

As described, according to this embodiment, a sufficient winding space can be assured for the winding core 21. It is possible to attain a spindle motor with high output without deteriorating the performance of the motor while reducing the size and thickness of the motor. It is also possible to reduce shaft loss caused between the rotor shaft 15 and the bearing 20 can be reduced.

While, in this embodiment, the rotor cap body 17a is constituted by brass, same advantage can be expected by constituting it with other alloy or resin material with good workability, and forming the hard coating 2 on its surface, so that a spindle motor with low power consumption can be attained.

An alloy material with good workability such as stainless steel or brass or a resin material electroless nickel plated on its surface can be used as the material for the rotor shaft 15.

Embodiment 4

Figure 4:
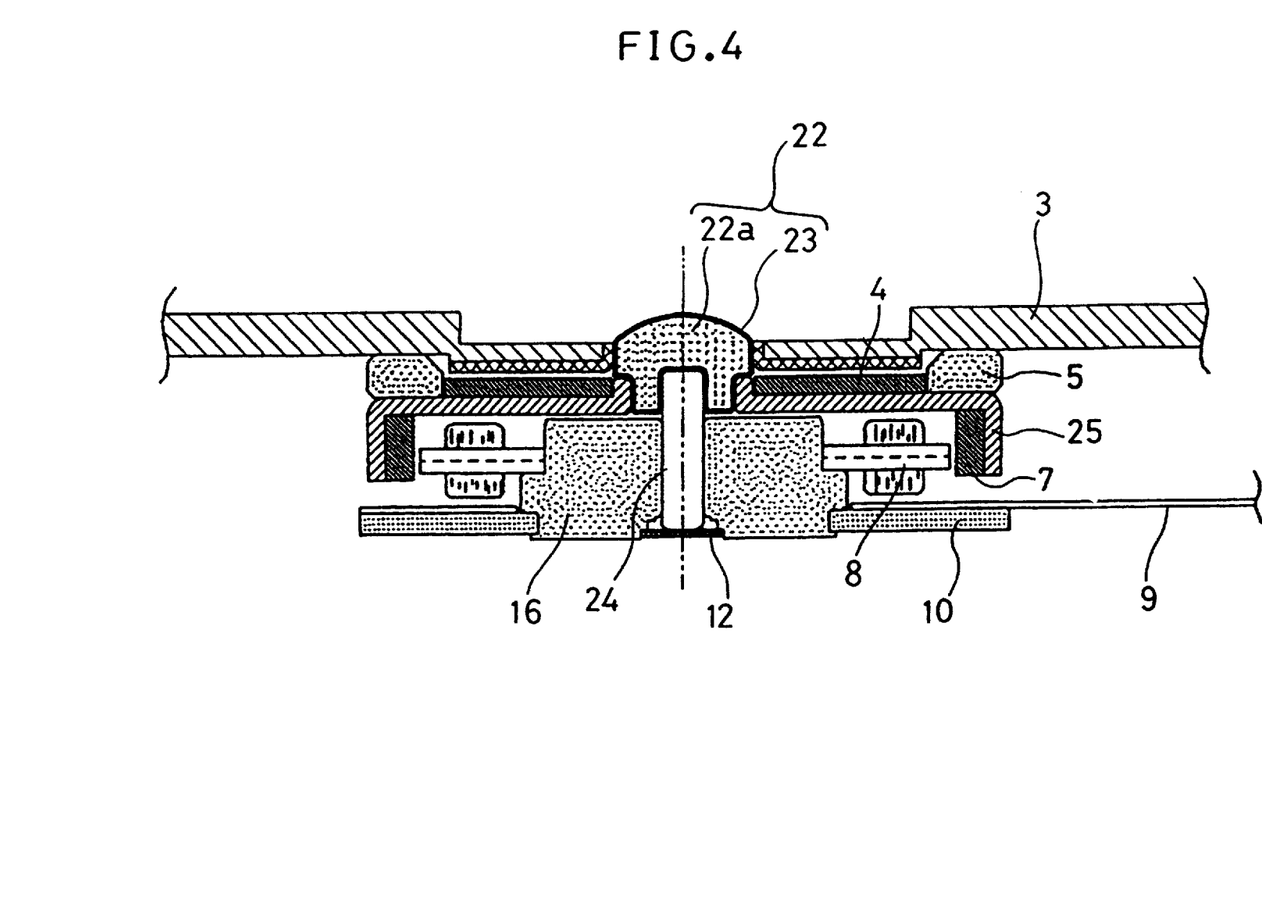
FIG. 4 is a sectional view of the structure of a spindle motor according to Embodiment 4.

FIG. 4 shows a spindle motor of Embodiment 4.

Description is made by identifying components same as those of Embodiment 2 with same references.

A rotor cap 22 is inserted and secured on a rotor shaft 24 by a method such as press fitting. The rotor cap 22 is constituted by forming a hard coating 23 of 5–10 μm on the surface of a rotor cap body 22a made of brass with electroless nickel plating.

A rotor frame 25 is secured on the rotor cap 22 with a method such as press fitting. A spindle hub 5 is secured on the outer periphery of the upper surface of the rotor frame 25, and receives the disc 3 which is attracted onto the upper surface of the rotor frame 25 by a clamp magnet 4 mounted within the spindle hub 5. A rotor magnet 7 is mounted on the inner periphery of the rotor frame 25 by a method such as bonding.

The rotor shaft 24 is supported by a bearing 16 and a thrust plate 12. The thrust plate 12 is mounted on the bearing 16. A base 10 which is a chassis of the motor and a flexible printed circuit board 9 are also mounted and secured on the bearing 16. A winding core 8 is also secured on the bearing 16 to generate electromotive force.

Figure 6:
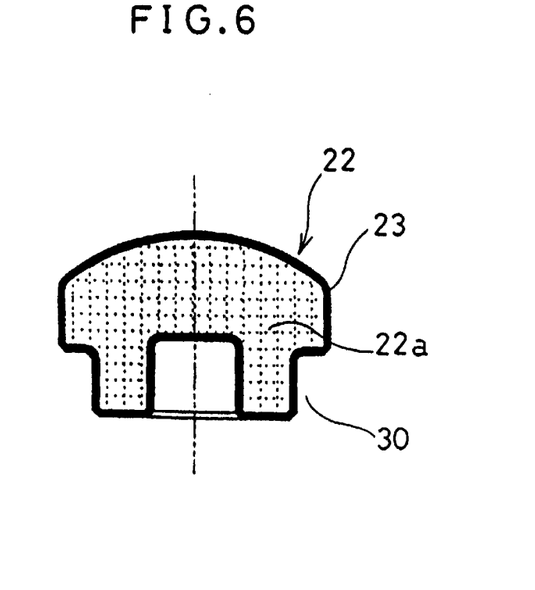
FIG. 6 is a sectional view of a rotor cap in Embodiment 4.

FIG. 6 shows in detail the rotor cap 22 of Embodiment 4. The rotor cap 22 is formed with a circumferential recess 30. The rotor frame 25 is mounted on this recess 30.

In the spindle motor arranged as above, when the recess 30 in the rotor cap 22 is formed with a depth deeper than the thickness of the rotor frame 25, the dimension of inner diameter of the clamp magnet 26 can be closed to the outer diameter of the rotor cap 22, so that the surface area of the clamp magnet 26 can be made larger than the conventional arrangement.

As described above, according to this embodiment, since the surface area of the clamp magnet 26 can be made larger thus to increase the attracting force, the clamp magnet 26 can be further thinned, and the conventional performance can be assured even if the material is of lower grade, so that a spindle motor with low material cost can be attained.

While, in this embodiment, the rotor cap body 22a is constituted by brass, same advantage can be expected by constituting it with other alloy or resin material with good workability, and forming the hard coating 23 on its surface, so that a spindle motor with low power consumption can be attained.

An alloy material with good workability such as stainless steel or brass or a resin material electroless nickel plated on its surface can be used as the material for the rotor shaft 24.

Embodiment 5

Figure 5:
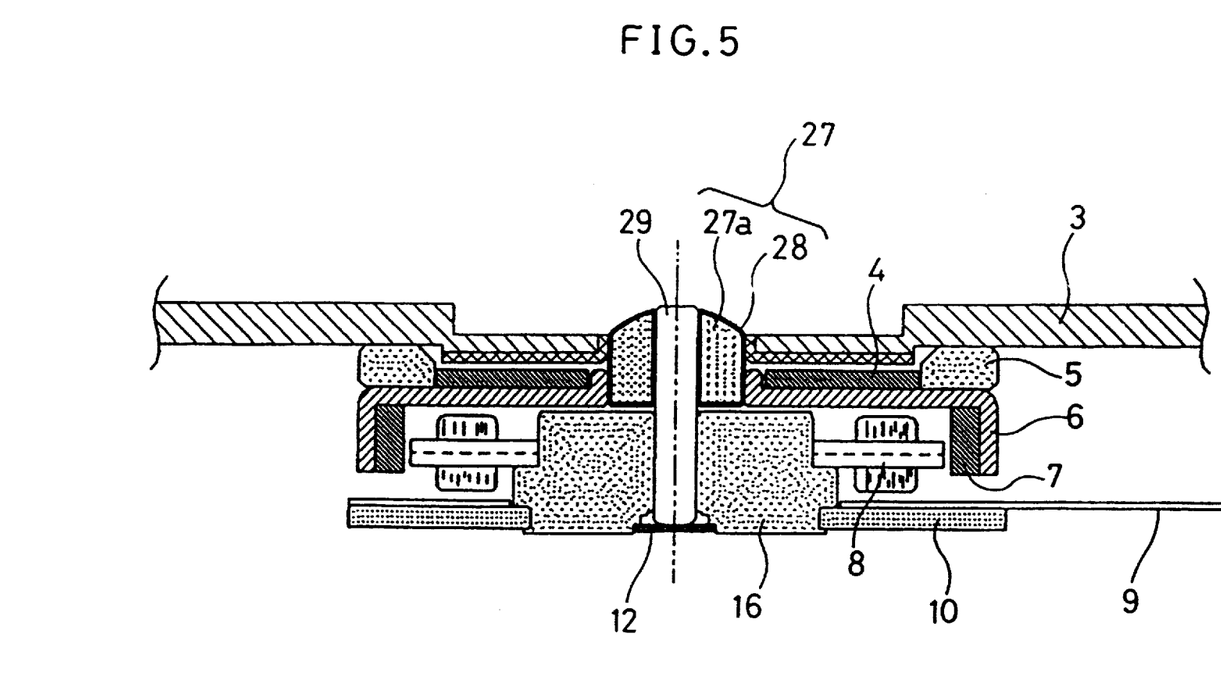
FIG. 5 is a sectional view of the structure of a spindle motor according to Embodiment 5.

FIG. 5 shows a spindle motor of Embodiment 5.

Description is made by identifying components same as those of Embodiment 2 with same references.

A rotor cap 27 is inserted and secured on a rotor shaft 29 by a method such as press fitting. The rotor cap 27 is constituted by forming a hard coating 28 of 5–10 μm on the surface of a rotor cap body 27a made of brass with electroless nickel plating.

A rotor frame 6 is secured on the rotor cap 27 with a method such as press fitting. A spindle hub 5 is secured on the outer periphery of the upper surface of the rotor frame 6, and receives the disc 3 which is attracted onto the upper surface of the rotor frame 6 by a clamp magnet 4 mounted within the spindle hub 5. A rotor magnet 7 is mounted on the inner periphery of the rotor frame 6 by a method such as bonding.

The rotor shaft 29 is supported by a bearing 16 and a thrust plate 12. The thrust plate 12 is mounted on the bearing 16. A base 10 which is a chassis of the motor and a flexible printed circuit board 9 are also mounted and secured on the bearing 16. A winding core 8 is also secured on the bearing 16 to generate electromotive force.

Figure 7:
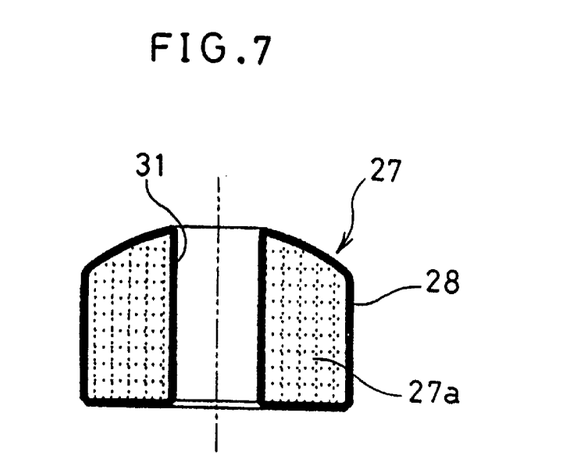
FIG. 7 is a sectional view of a rotor cap in Embodiment 5.

FIG. 7 shows in detail the rotor cap 27 of Embodiment 5.

Provided through the rotor cap 27 is a through hole 31 through which the rotor shaft 29 is inserted to its end with means such as press fitting.

In the spindle motor arranged as above, provision of the through hole 31 in the rotor cap 29 improves workability and alignment between the outer and inner diameters of the rotor cap 29. In addition, it is possible to surely make longer the dimension of the joint between the rotor cap 29 and the rotor shaft 27, so that both the alignment and accuracy between the rotor shaft 29 and the rotor cap 27 can be easily maintained after their insertion.

As described above, according to this embodiment, the cost can be reduced because of good workability of the rotor cap 27. In addition, the alignment at high accuracy can be attained between the rotor shaft 29 and the rotor cap 27.

While, in this embodiment, the rotor cap body 27a comprises the brass, same advantage can be expected with other alloys or resin materials with good workability, and forming the hard coating 28 on its surface, so that a spindle motor with low power consumption can be attained.

An alloy material with good workability such as stainless steel or brass or a resin material electroless nickel plated on its surface can be used as the material for the rotor shaft 29.

While the rotor shaft 1 of Embodiment 1, and the rotor caps 13, 17, 22, and 27 of Embodiments 2–5 are hardened by forming the hard coatings 2, 14, 18, 23, and 28, respectively, it can be naturally attained by using surface improvement techniques such as ion beam.

As seen from Embodiments 1–5 above, the material for the rotor shaft can be freely selected by taking cost into account, without adhering to conventional stainless steel.

In addition, in this case, the hardness necessary for the rotor shaft of the spindle motor when the rotor cap is not used can be obtained by forming a hard coating. The hardness necessary for the rotor cap of the spindle motor when the rotating shaft is constituted by the rotor cap and the rotor shaft can be obtained by forming a hard coating.

Furthermore, since, when the rotating shaft is constituted by the rotor cap and the rotor shaft, the inner diameter of the bearing can be reduced without changing the outer diameter of the rotor cap, loss at the bearing can be easily reduced, and a winding space can be assured, so that the performance of the motor can be improved.

We claim:

1. A spindle motor, comprising:

a rotor shaft body and a bearing for supporting said rotor shaft body, wherein the material for said rotor shaft body comprises one of a resin material and an alloy material having good workability, and a hard coating layer formed by electroless nickel plating of at least 5 $\mu$m and of 500 or more in Vickers hardness is disposed on the surface of said rotor shaft body.

2. A spindle motor, comprising: a rotor shaft, a bearing for supporting said rotor shaft, and a rotor cap body secured on said rotor shaft, wherein the material for said rotor cap body comprises one of a resin material and an alloy material having good workability, and a hard coating formed by electroless nickel plating of at least 5 $\mu$m and of 500 or more in Vickers hardness is disposed on the surface of said rotor cap body.

3. A spindle motor, comprising: a rotor shaft having a diameter of 2 mm or less, a bearing for supporting said rotor shaft, a rotor cap body secured on said rotor shaft, and a winding core secured on said bearing, wherein A$\geq$B where the outer diameter of the rotor cap body is A, and the inner diameter of the winding core is B, and wherein the material for said rotor cap body comprises one of a resin material and an alloy material having good workability, and a hard coating formed by electroless nickel plating of at least 5 $\mu$m and of 500 or more in Vickers hardness is disposed on the surface of said rotor cap body.

4. A spindle motor, comprising: a rotor shaft, a bearing for supporting said rotor shaft, a rotor cap body secured on said rotor shaft, a rotor frame secured on said rotor cap body, and a clamp magnet mounted on said rotor frame, wherein the material for said rotor cap body comprises one of a resin material and an alloy material having good workability, and a recess for securing the rotor frame is formed in the outer surface of said rotor cap body, and a hard coating formed by electroless nickel plating of at least 5 $\mu$m and of 500 or more in Vickers hardness is disposed on the surface of said rotor cap body.

5. A spindle motor, comprising: a rotor shaft, and a rotor cap body secured on said rotor shaft, wherein a section of said rotor cap body into which the rotor shaft is inserted is a through hole, the material for said rotor shaft cap comprises one of a resin material and an alloy material having good workability, and a hard coating formed by electroless nickel plating of at least 5 $\mu$m and of 500 or more in Vickers hardness is disposed on the surface of said rotor cap body.

6. The spindle motor claimed in claim 2, wherein the alloy material comprises brass.

7. The spindle motor claimed in claim 3, wherein the alloy material comprises brass.

8. The spindle motor claimed in claim 4, wherein the alloy material comprises brass.

* * * * *